Aug. 14, 1934.  M. PIER ET AL  1,970,248
PRODUCTION OF VALUABLE HYDROCARBONS FROM VARIETIES
OF COAL, TARS, MINERAL OILS, AND THE LIKE
Filed Sept. 5, 1930   2 Sheets-Sheet 1
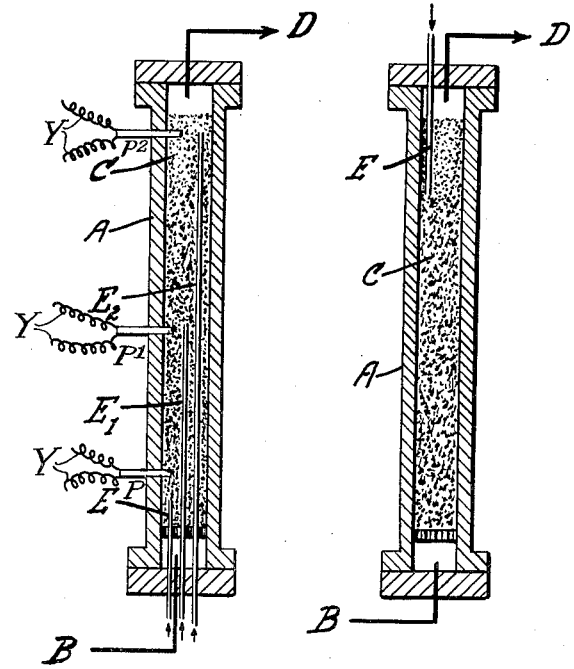
INVENTOR.
MATHIAS PIER
ERNST HOCHSCHWENDER
BY Hauff&Warland ATTORNEYS.

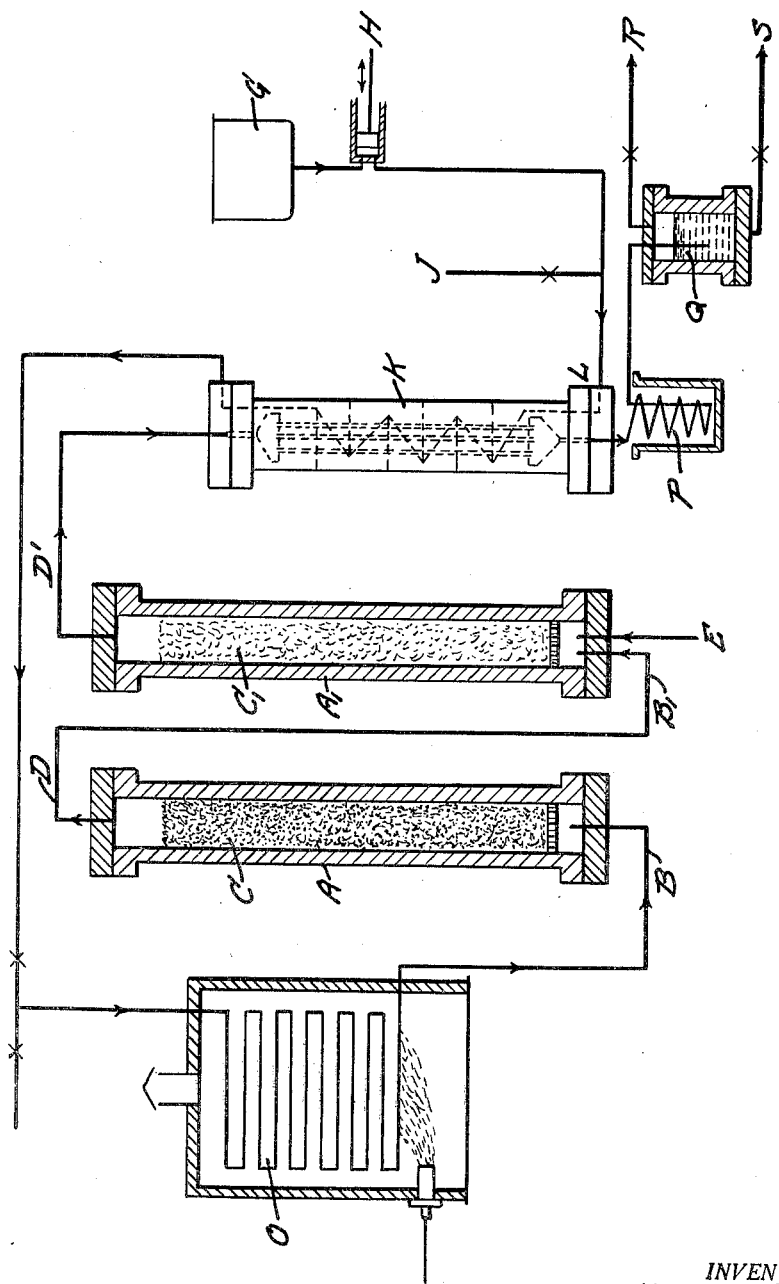

Patented Aug. 14, 1934

1,970,248

UNITED STATES PATENT OFFICE 1,970,248

PRODUCTION OF VALUABLE HYDROCARBONS FROM VARIETIES OF COAL, TARS, MINERAL OILS, AND THE LIKE

Mathias Pier, Heidelberg, and Ernst Hochschwender, Ludwigshafen-on-the-Rhine, Germany, assignors to Standard-I. G. Company, Linden, N. J., a corporation of Delaware Application September 5, 1930, Serial No. 479,934
In Germany September 17, 1929

14 Claims. (Cl. 196—53)

The present invention relates to the production of valuable hydrocarbons from varieties of coal, tars, mineral oils and the like.

For the destructive hydrogenation of distillable carbonaceous materials such as varieties of coal, tars, minerals oils and the like in order to obtain valuable liquid hydrocarbons, which hydrogenation is effected at temperatures higher than 300° C. preferably between 350° and 550° C., at pressures of at least 20 atmospheres, preferably above 50 atmospheres, and preferably in the presence of catalysts such as those referred to in the specification for the Australian Patent No. 1,217 A. D. 1926, several heating methods have already been proposed which relate partly to the preheating of the reaction components or a part of the same before their entry into the reaction chamber and partly to the heating of the reaction chamber itself. The processes of external heating of the reaction chamber hitherto proposed, however, have the objection that the heat transference from the heating medium to the walls of the vessel and from thence to the reaction components is not entirely satisfactory. On the other hand, when employing internal heating, as for example by means of preheated hydrogen or by the supply of hot scavenging gases, the small heat capacity of these gases is usually somewhat troublesome. We have now found that in the said process the internal heating may be effected in a particularly simple and advantageous manner without externally heating the reaction chamber, by the addition to the reacting materials of oxygen containing compounds of carbon or substances containing substantial amounts thereof, which under the working conditions are reduced to form hydrocarbons with the production of a considerable heat, the said compounds being added in such an amount as to obtain or maintain the desired reaction temperature.

As examples of such compounds may be mentioned phenols or the oxides of carbon, such as carbon monoxide or carbon dioxide or mixtures thereof, or substances containing substantial amounts of one or more of the said compounds. Especially suitably for the process according to the present invention are such substances as are converted into hydrocarbons with an evolution of heat of more than 800 kilogram calories per kilogram of added substance.

The said conversion of oxygen containing carbon compounds into hydrocarbons may take place in particular in the presence of destructive hydrogenating catalysts having a strong hydrogenating effect as for example those comprising metals of group 6 such as molybdenum or tungsten. According to the present invention it is preferable to preheat the initial materials to a temperature of at least +350° or 380° C. and then adding the said oxygen containing compounds of carbon, while, if desired, further heating by heat transfer.

In this way it is easy in many cases to supply to the reaction chamber the entire amount of heat necessary to maintain the reaction temperature. By a corresponding regulation of the amounts of the substances to be added or by supplying them at one or more suitable points in the reaction chamber, that is not, or not all of them, from the beginning, but at one or more later stages of the treatment, it is possible to regulate the temperature as desired.

The process according to the present invention is carried out under elevated pressures, as for example 20, 50, 100, 200, 500 atmospheres or more, and preferably under pressures exceeding 50 atmospheres.

The present manner of working is attended by the great advantage that even when working in very long reaction vessels or in a series of reaction vessels the desired temperature can be maintained throughout the reaction without any special heating means.

The above described method is particularly advantageous in cases where liquid products are treated in the lower part of the reaction vessel, which may have for example the form of a tower, and in which the vapors evolved in the lower part are treated in the upper part. The said vapors are very liable to cool down, whereas this is entirely avoided according to the present invention, by introducing into the ascending vapors the said oxygen containing carbon compounds. When several reaction vessels are arranged in series one behind the other, the heat of the reaction would be quite insufficient for maintaining the required temperature in the vessels following the first one, or first ones, and this can be counteracted by introducing the said heat evolving oxygen compounds between the several vessels or at a suitable place directly into the vessels, where the temperature would improperly fall.

Destructive hydrogenation, as is known, is an exothermic reaction. However the heat evolved thereby in most cases is not sufficient to compensate the losses of heat caused by radiation and conduction of heat to the outside. Therefore additional heat should be supplied to the reaction space which according to the present invention is effected by the addition of oxygen-containing carbon compounds forming hydrocarbons under the conditions of working with the production of heat.

Methods of carrying out the invention in practice and the manner in which it may be performed are further described with reference to the accompanying drawings, but it will be understood that the invention is not restricted to operations carried out in the specific forms of apparatus shown.

Figures 1, 2 and 3 illustrate high pressure reaction vessels in vertical section provided with means for the introduction of the said oxygen containing compounds of carbon, and Figure 4 illustrates diagrammatically in section a complete plant for operating in accordance with the present invention.

Referring to Figures 1, 2 and 3, A is a high pressure vessel, into which hydrogen and carbonaceous materials may be introduced by the pipe B. C is the catalyst filling the said vessel. D is a pipe for the withdrawal of reaction products. In Figures 1 and 2, E, $E_1$ and $E_2$ are pipes for the introduction of the oxygen-containing compounds of carbon into the reaction vessel to places where an undesirable fall in temperature is liable to occur. The pipes E, $E_1$ and $E_2$ may be kept in operation all at once or some may be shut off, or the said oxygen-containing substances may be introduced through any of the said pipes wherever an undesired fall in temperature is indicated by the pyrometers P, $P^1$ and $P^2$ arranged in juxtaposition to the open ends of pipes E, $E_1$ and $E_2$, respectively, and provided with electrical conductors Y connected with the conventional recording instruments. These pyrometers are placed at points in the reaction vessel where a drop in temperature might be expected to occur by reason of loss of heat in the reaction zone by radiation, convection or otherwise. These pyrometers, as well as the pipes E, may vary in number to suit the needs of any particular plant. In Figure 3, the oxygen-containing compounds of carbon are introduced through the pipe F.

Referring to Figure 4, G is a container for carbonaceous material to be subjected to destructive hydrogenation. H is a booster pump. J is a pipe for the introduction of hydrogenating gas. K is a heat exchanger. O is a preheating coil. A and $A_1$ are high pressure reaction vessels filled with the catalyst C and $C_1$ respectively. F is a condenser and Q a separator. E is a pipe for the introduction of the oxygen containing compounds of carbon into vessel A'.

The following examples will further illustrate the nature of this invention but the invention is not restricted to these examples.

Example 1

Hydrogen and the vapors of a petroleum fraction which boils between 200° and 350° C. are passed under a pressure of 200 atmospheres through a high pressure reaction vessel charged with a catalyst containing molybdenum and zinc and not provided with any special heating means. 0.5 per cent of carbon dioxide is added to the mixture of hydrogen and oil vapors which before their entry into the vessel are preheated to 440° C. 96 per cent of the carbon dioxide is converted into methane in the vessel so that the gases leaving the vessel only contain 0.02 per cent of carbon dioxide. By reason of the heat evolved during the formation of methane, the reaction temperature of 460° C. necessary for the hydrogenation is attained and maintained in the reaction vessel without further supply of heat.

Example 2

Instead of carbon dioxide in the process according to Example 1, vapors of a brown coal tar fraction boiling within the same range of temperature as the petroleum fraction and containing 28 per cent of phenols are added in an amount of 50 per cent of the petroleum fraction to the mixture of hydrogen and oil vapors specified in Example 1. The phenols are almost quantitatively reduced to the corresponding hydrocarbons with the formation of water during the hydrogenation. By reason of the amount of heat evolved, the temperature of 460° C. necessary for the desired reaction is attained without further supply of heat to the reaction vessel. Instead of the addition hereinbefore specified, a corresponding amount of tar fractions rich in phenols, or pure phenols may be mixed with the initial materials.

What we claim is:—

1. In the production of valuable liquid hydrocarbons by the destructive hydrogenation of a distillable carbonaceous material, the steps which comprise preheating the initial material approximately to the reaction temperature, feeding the preheated material into a reaction vessel which is heated only by the heat derived from the reacting materials and supplying the heat necessary for obtaining and maintaining the temperature required for said destructive hydrogenation only by adding to the preheated material a sufficient amount of an oxygen containing compound of carbon, forming a hydrocarbon under the conditions of working with the production of heat, to compensate for the heat dissipated from the reaction zone.

2. In the production of valuable liquid hydrocarbons by the destructive hydrogenation of a distillable carbonaceous material, the steps which comprise preheating the initial material approximately to the reaction temperature, feeding the preheated material into a reaction vessel which is heated only by the heat derived from the reacting materials and supplying the heat necessary for obtaining and maintaining the temperature required for said destructive hydrogenation only by adding to the preheated material a sufficient amount of an oxygen containing compound of carbon, forming a hydrocarbon under the conditions of working with an evolution of heat of more than 800 kilograms calories per kilogram of added substance, to compensate for the heat dissipated from the reaction zone.

3. In the production of valuable liquid hydrocarbons by the destructive hydrogenation of a distillable carbonaceous material, the steps which comprise preheating the initial material approximately to the reaction temperature, feeding the preheated material into a reaction vessel which is heated only by the heat derived from the reacting materials and supplying the heat necessary for obtaining and maintaining the temperature required for said destructive hydrogenation only by adding to the preheated material a sufficient amount of an oxide of carbon, forming methane under the conditions of working with the production of heat, to compensate for the heat dissipated from the reaction zone.

4. In the production of valuable liquid hydrocarbons by the destructive hydrogenation of a distillable carbonaceous material, the steps which comprise preheating the initial material approximately to the reaction temperature, feeding the preheated material into a reaction vessel which is heated only by the heat derived from the reacting materials and supplying the heat necessary for obtaining and maintaining the temperature required for said destructive hydrogenation only by adding to the preheated material a sufficient amount of phenol, forming a hydrocarbon of the benzene series under the conditions of working with the production of heat, to compensate for the heat dissipated from the reaction zone.

5. In the production of valuable liquid hydrocarbons by the destructive hydrogenation of a distillable carbonaceous material, the steps which comprise preheating the initial material to substantially raise the temperature thereof, but to a degree less than the reaction temperature, feeding the preheated material into a reaction vessel which is heated only by the heat derived from the reacting materials and supplying the heat necessary for obtaining and maintaining the temperature required for said destructive hydrogenation only by adding to the preheated material a sufficient amount of an oxygen containing compound of carbon, forming a hydrocarbon under the conditions of working with the production of heat, to compensate for the heat dissipated from the reaction zone.

6. The process as defined in claim 1 wherein the oxygen containing compound of carbon is carbon monoxide.

7. The process as defined in claim 1 wherein the destructive hydrogenation is effected in the presence of a catalyst immune to poisoning by sulphur.

8. In the production of valuable liquid hydrocarbons by the destructive hydrogenation of a distillable carbonaceous material, at a temperature of from about 350 to 550° C. and a pressure of at least 20 atmospheres in the presence of a catalyst comprising a metal of group 6 of the periodic system, the steps which comprise preheating the initial material approximately to the reaction temperature, feeding the preheated material into a reaction vessel which is heated only by the heat derived from the reacting materials and supplying the heat necessary for obtaining and maintaining the temperature required for said destructive hydrogenation only by adding to the preheated material a sufficient amount of an oxygen containing compound of carbon, forming a hydrocarbon under the conditions of working with the production of heat, to compensate for the heat dissipated from the reaction zone.

9. The process as defined in claim 8 wherein the oxygen containing compound of carbon is carbon monoxide.

10. In the production of valuable liquid hydrocarbons by the destructive hydrogenation of a distillable carbonaceous material the step which comprises preheating the initial material and supplying the heat necessary for obtaining and maintaining the temperature required for said destructive hydrogenation only by adding to the preheated material at several different points of the reaction space a sufficient amount of an oxygen containing compound of carbon forming under the conditions of working a hydrocarbon with the production of heat.

11. In the production of valuable liquid hydrocarbons by the destructive hydrogenation of a distillable carbonaceous material, the step which comprises preheating the initial material and supplying the heat necessary for obtaining and maintaining the temperature required for said destructive hydrogenation only by adding to the preheated reagents, the destructive hydrogenation treatment of which has already commenced, an oxygen containing compound of carbon forming under the conditions of working a hydrocarbon with the production of heat, in a sufficient amount at a point in the course of the destructive hydrogenation, where an undesired fall in the temperature is liable to occur.

12. In the production of valuable liquid hydrocarbons by the destructive hydrogenation of a distillable carbonaceous material, the step which comprises preheating the initial material and supplying the heat necessary for obtaining and maintaining the temperature required for said destructive hydrogenation only by adding to the preheated reagents, the destructive hydrogenation treatment of which has already commenced, an oxygen containing compound of carbon forming under the conditions of working a hydrocarbon with the production of heat, in a sufficient amount at several different points in the course of the destructive hydrogenation, where an undesired fall in temperature is liable to occur.

13. In the production of valuable liquid hydrocarbons by the destructive hydrogenation of a distillable carbonaceous material, the step which comprises preheating the initial material and supplying the heat necessary for obtaining and maintaining the temperature required for said destructive hydrogenation only by adding to the preheated reagents, the destructive hydrogenation treatment of which has already commenced, an oxide of carbon in a sufficient amount at a point in the course of the destructive hydrogenation, where an undesired fall in temperature is liable to occur.

14. A process for the destructive hydrogenation of a mineral oil which comprises vaporizing the mineral oil, mixing the vapors thus obtained with hydrogen and bringing the resulting mixture to a pressure of about 200 atmospheres, preheating the mixture to a temperature of about 440° C., feeding the preheated mixture into a reaction vessel which is heated only by the heat derived from the reacting materials and which contains a catalyst comprising molybdenum and zinc and supplying the heat necessary for obtaining and maintaining the temperature required for said destructive hydrogenation only by adding to the preheated material 0.5 percent of carbon dioxide thereby compensating for the heat dissipated from the reaction zone.

MATHIAS PIER.
ERNST HOCHSCHWENDER.